United States Patent
Liao et al.

(10) Patent No.: US 7,340,101 B2
(45) Date of Patent: Mar. 4, 2008

(54) DEVICE AND METHOD FOR COMPRESSING AND DECOMPRESSING DATA FOR GRAPHICS DISPLAY

(75) Inventors: Ira Liao, Hsinchu (TW); Titan Sun, Hsinchu (TW)

(73) Assignee: Via Technologies, Inc., Taipei (TW)

( * ) Notice: Subject to any disclaimer, the term of this patent is extended or adjusted under 35 U.S.C. 154(b) by 745 days.

(21) Appl. No.: 10/678,426

(22) Filed: Oct. 3, 2003

(65) Prior Publication Data

US 2004/0071355 A1   Apr. 15, 2004

(30) Foreign Application Priority Data

Oct. 11, 2002   (TW) ................ 91123519 A

(51) Int. Cl.
*G06K 9/46* (2006.01)
*H04N 11/02* (2006.01)

(52) U.S. Cl. .................... 382/238; 375/240.24

(58) Field of Classification Search .......... 382/238, 382/246, 247; 375/240.23, 240.24

See application file for complete search history.

(56) References Cited

U.S. PATENT DOCUMENTS

| | | | |
|---|---|---|---|
| 4,816,901 A * | 3/1989 | Music et al. ........... 375/240.01 |
| 4,914,508 A * | 4/1990 | Music et al. ........... 375/240.01 |
| 5,014,127 A * | 5/1991 | Richards ............... 348/384.1 |
| 5,185,655 A * | 2/1993 | Wakeland .............. 348/392.1 |
| 5,341,442 A * | 8/1994 | Barrett .................. 382/166 |
| 5,438,635 A * | 8/1995 | Richards ............... 382/232 |
| 5,528,514 A * | 6/1996 | Hancock et al. ....... 709/247 |
| 5,739,861 A * | 4/1998 | Music ................ 375/240.01 |
| 6,256,347 B1 * | 7/2001 | Yu et al. ............. 375/240.13 |
| 6,757,438 B2 * | 6/2004 | Graffagnino ........... 382/240 |
| 7,050,639 B1 * | 5/2006 | Barnes et al. .......... 382/239 |
| 2006/0045178 A1 * | 3/2006 | Schu et al. ......... 375/240.01 |

* cited by examiner

*Primary Examiner*—Jingge Wu
*Assistant Examiner*—Jeffrey S Smith
(74) *Attorney, Agent, or Firm*—Kirton & McConkie; Evan R. Witt

(57) ABSTRACT

A data compressing and decompressing device is adapted to be used with an image pickup device and a frame buffer. The data compressing and decompressing device includes a first data register in communication with the image pickup device, a first encoder in communication with the first data register, a second encoder in communication with the first encoder and the frame buffer, a decoder in communication with the frame buffer, and a second data register in communication with the decoder. The second encoder encodes the difference into a length-variable recovery data code in a first condition of the difference, encodes the difference into a first constant-length recovery data code in a second condition of the difference, and encodes the difference into a second constant-length recovery data code in a third condition of the difference.

11 Claims, 8 Drawing Sheets

| $D_i = Y(i+1)[7:0] - Y(i)[7:0]$ | Recovery data code | $Y'(i+1)$ |
|---|---|---|
| 0 | 100 | $Y'(i)[7:0]$ |
| ±1 | 101 s | $Y'(i)[7:0] \pm 1$ |
| ±2 | 11 00 s | $Y'(i) \pm 2$ |
| ±3 | 11 010 s | $Y'(i) \pm 3$ |
| ±4 | 11 011 s | $Y'(i) \pm 4$ |
| ±5 | 111 00 s | $Y'(i) \pm 5$ |
| ±6 | 111 010 s | $Y'(i) \pm 6$ |
| ±7 | 111 011 s | $Y'(i) \pm 7$ |
| ±8 | 1111 000 s | $Y'(i) \pm 8$ |
| ±9 | 1111 001 s | $Y'(i) \pm 9$ |
| ±10 | 1111 010 s | $Y'(i) \pm 10$ |
| ±11 | 1111 011 s | $Y'(i) \pm 11$ |
| ±12 | 1111 100 s | $Y'(i) \pm 12$ |
| ±13 | 1111 101 s | $Y'(i) \pm 13$ |
| ±14 | 1111 110 s | $Y'(i) \pm 14$ |
| ±15 | 1111 111 s | $Y'(i) \pm 15$ |
| Otherwise | $D_i/2$ | $Y'(i)[7:0] + D_i'$ |

Compression → Recovery data code → Decompression

Fig.5A

| Di=Y(i+1)[7:0]-Y(i)[7:0] | Recovery data code | Y'(i+1) |
|---|---|---|
| 0 | 100 | Y'(i)[7:0] |
| ±1 | 101 s | Y'(i)[7:0]±1 |
| ±2 | 11 00 s | Y'(i)±2 |
| ±3 | 11 010 s | Y'(i)±3 |
| ±4 | 11 011 s | Y'(i)±4 |
| ±5 | 111 00 s | Y'(i)±5 |
| ±6 | 111 010 s | Y'(i)±6 |
| ±7 | 111 011 s | Y'(i)±7 |
| ±8 | 1111 000 s | Y'(i)±8 |
| ±9 | 1111 001 s | Y'(i)±9 |
| ±10 | 1111 010 s | Y'(i)±10 |
| ±11 | 1111 011 s | Y'(i)±11 |
| ±12 | 1111 100 s | Y'(i)±12 |
| ±13 | 1111 101 s | Y'(i)±13 |
| ±14 | 1111 110 s | Y'(i)±14 |
| ±15 | 1111 111 s | Y'(i)±15 |
| Otherwise | 0 Y(i+1) [7:1] | Y(i+1) [7:1] 0 |

DEVICE AND METHOD FOR COMPRESSING AND DECOMPRESSING DATA FOR GRAPHICS DISPLAY

FIELD OF THE INVENTION

The present invention relates to a device and a method for compressing and decompressing data, and more particularly to a device and a method for compressing and decompressing data for graphics display.

BACKGROUND OF THE INVENTION

In a conventional computer system of FIG. 1, a north bridge chip 11 and a south bridge chip 12 are used to control data flows among a microprocessor 10, a system memory 13, and a plurality of I/O devices including a graphics card 14. The microprocessor 10 accesses graphics data of the system memory 13 or outputs graphing commands to the graphics card 14 via the north bridge chip 11. The system memory 13 is usually a dynamic random access memory (DRAM). The graphics card 14 is electrically connected to the north bridge chip 11 via a PCI (Peripheral Component Interconnect) or AGP (Accelerated Graphics Port) bus, and comprises a graphics chip 141, a local memory 142 and an analog-to-digital (A/D) converter 143. The local memory 142 of the graphics card 14 is usually used as a frame buffer. Furthermore, the AGP memory 131 of the system memory 13 can be accessed by the graphics chip 141 in a directly access mode, and used as a texture buffer.

Nowadays, many electrical appliances are widely used with computers due to the amazing power of computers. So far, the image source processed by a computer system includes, for example, a TV tuner 15. The analog signals from the TV tuner 15 are firstly transmitted to the graphics card 14 and converted into digital signals by the analog-to-digital converter 143. Then, the digital signals are transmitted to the graphics chip 141 to be processed. The processed image signals are written in the frame buffer of the local memory 142, and then read out to be displayed. On the other hand, the digital image signals are written in the AGP memory 131 of the system memory 13 in a direct memory access (DMA) mode. The digital image signals stored in the AGP memory 131 of the system memory 13 are further converted into a file and stored in a non-volatile memory device such as a hard disc 16.

Since the amount of image data are huge, large memory space, memory bandwidth, bandwidth of the PCI (Peripheral Component Interconnect) or AGP (Accelerated Graphics Port) bus and even storage space of the non-volatile memory device are required for pickup and display of the image data. The tremendous image data transmission might reduce the overall performance of the computer system. Therefore, proper compression and decompression operations are desirably performed to solve these problems.

SUMMARY OF THE INVENTION

It is an object of the present invention to provide a method and a device for compressing and decompressing data for graphics display, which reduce image data amount in transmission, so as to enhance performance of the computer system.

In accordance with a first aspect of the present invention, a data-compressing method comprises steps of: operating a first and a second data to take a difference between the values of the first and the second data; encoding the difference into a first recovery data code having a bit number less than m when the absolute value of the difference is less than a first threshold; encoding the difference into a second recovery data code having a bit number equal to m when the absolute value of the difference is no less than the first threshold but no greater than a second threshold; and encoding the difference into a third recovery data code proportional to the difference when the absolute value of the difference is greater than the second threshold.

The first and the second data represent luma or chroma values of two immediately adjacent pixels.

Preferably, a bit number of the difference is equal to m, and a bit number of the third recovery data code is equal to m.

Preferably, the bit number of the first recovery data code varies with the difference.

Preferably, each of the first and the second recovery data codes corresponding to the difference having the absolute value greater than zero but no greater than the second threshold includes a tag bit representing the sign of the difference.

Preferably, the third recovery data code corresponds to a half of the difference.

In one embodiment, the first and the second recovery data codes are obtained according to a correlation table.

A data-decompressing method as follows is preferably used with the data-compressing method mentioned above. The data-decompressing method comprises steps of: receiving a recovery data code; determining whether the recovery data code is the first, the second or the third recovery data code; realizing the difference according to the recovery data code and the correlation table when the recovery data code is the first or the second data code; realizing the difference by proportionally operating the recovery data code when the recovery data code is the third data code; and adding the difference to the first data to recover the second data.

A second aspect of the present invention relates to a data-compressing method, comprising steps of: operating a first and a second data to take a difference between the values of the first and the second data; encoding the difference into a first recovery data code having a bit number less than m when the absolute value of the difference is less than a first threshold; encoding the difference into a second recovery data code having a bit number equal to m when the absolute value of the difference is no less than the first threshold but no greater than a second threshold; and encoding the second data into a third recovery data code when the absolute value of the difference is greater than the second threshold.

In one embodiment, the third recovery data code includes a designated bit grafted to selected bits of the second data. The third recovery data code is obtained by truncating the end bit of the second data and grafting the designated bit as the leading bit of the second data.

Preferably, each of the first and the second recovery data codes has a characteristic bit different from a characteristic bit of the third recovery data code. The characteristic bit, for example, can be the leading bit of each of the recovery data codes. For example, the characteristic bit is "1" for each of the first and the second recovery data codes, and "0" for the third recovery data code.

A data-decompressing method as follows is preferably used with the data-compressing method mentioned above. The data-decompressing method comprises steps of: receiving a recovery data code; checking the characteristic bit of the recovery data code to determine whether the absolute value of the difference is greater than the second threshold;

realizing the difference according to the recovery data code and a correlation table, and adding the difference to the first data to recover the second data when the absolute value of the difference is no greater than the second threshold; and truncating the leading bit of the recovery data code and tagging an end bit to the recovery data code to recover the second data when the absolute value of the difference is greater than the second threshold.

According to a third aspect of the present invention, a data compressing and decompressing device for use with an image pickup device and a frame buffer comprises: a first data register in communication with the image pickup device for storing therein a first and a second data outputted by the image pickup device; a first encoder in communication with the first data register, operating the first and the second data to obtain a difference between values of the first and the second data; and a second encoder in communication with the first encoder and the frame buffer, encoding the difference into a length-variable recovery data code in a first condition of the difference, encoding the difference into a first constant-length recovery data code in a second condition of the difference, and encoding the difference into a second constant-length recovery data code in a third condition of the difference.

In one embodiment, the first condition holds when the difference has the absolute value thereof less than a first threshold, the second condition holds when the difference has the absolute value thereof no less than the first threshold but no greater than a second threshold, and the third condition holds when the difference has the absolute value thereof greater than the second threshold.

In one embodiment, each of the first data, the second data and the difference has a bit number m.

Preferably, the length-variable recovery data code has a bit number less than m, and each of the first and the second constant-length recovery data code has a bit number equal to m.

In one embodiment, the second constant-length recovery data code is proportional to the difference. The data compressing and decompressing device further comprises: a second data register storing therein the first data having been compressed and decompressed; and a decoder in communication with the frame buffer and the second data register, decoding the length-variable and the first constant length into the difference according to a correlation table, and decoding the second constant length recovery data code by operating the second constant length recovery data code.

In one embodiment, the second constant-length recovery data code is proportional to the second data. The data compressing and decompressing device comprises: a second data register storing therein the first data having been compressed and decompressed; and a decoder in communication with the frame buffer and the second data register, decoding the length-variable and the first constant length into the difference according to a correlation table, and decoding the second constant length recovery data code by operating the second data.

The first encoder, foe example, can be a differential pulse encoding modulator.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 5A is a correlation table schematically showing the compressing and decompressing algorithm for use in the graphics display method according to a preferred embodiment of the present invention;

FIG. 5B is a correlation table schematically showing the compressing and decompressing algorithm for use in the graphics display method according to another preferred embodiment of the present invention;

FIG. 7A is a schematic diagram showing a conventional format of a compressed data; and FIG. 7B is a schematic diagram showing a format of a compressed data obtained by the compressing method according to the present invention.

DETAILED DESCRIPTION OF THE PREFERRED EMBODIMENT

Figure 1:
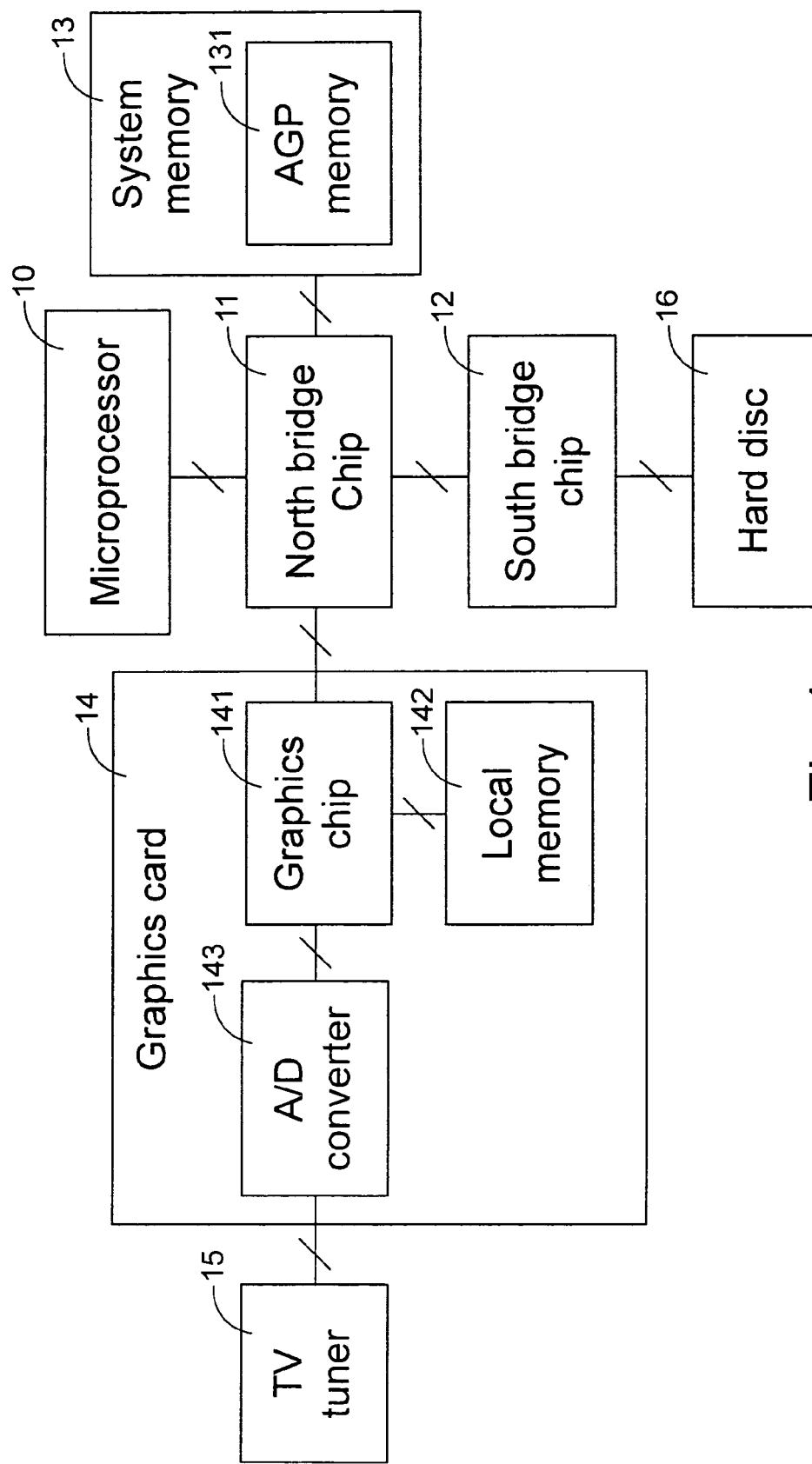
FIG. 1 is a block diagram showing the structure of a conventional computer system.
Figure 2:
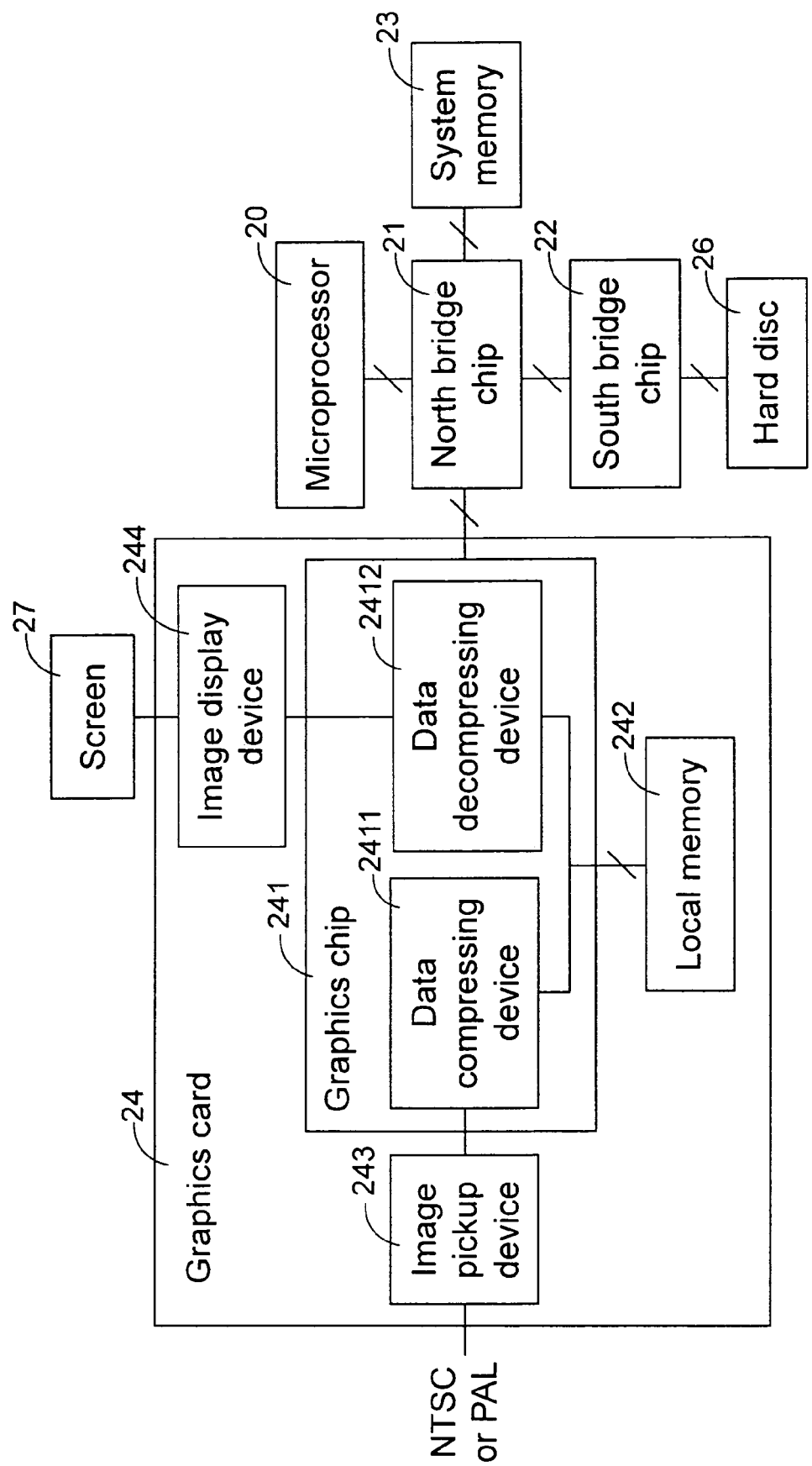
FIG. 2 is a block diagram showing a graphic display module for use in a computer system according to a preferred embodiment of the present invention.

Referring to FIG. 2, a computer system comprising therein a graphics display module executing the graphics display method according a preferred embodiment of the present invention is illustrated. The graphics display module comprises a microprocessor 20, a north bridge chip 21, a south bridge chip 22, a system memory 23 and a graphics card 24. The north bridge chip 21 and the south bridge chip 22 control data flows among the microprocessor 20, the system memory 23, and a plurality of I/O devices including the graphics card 24. The graphics card 24 is electrically connected to the north bridge chip 21 via a PCI (Peripheral Component Interconnect) or AGP (Accelerated Graphics Port) bus, and comprises a graphics chip 241, a local memory 242, an image pickup device 243 and an image display device 244. A data compressing device 2411 and a data decompressing device 2412 are incorporated into the graphics chip 241. The image pickup device 243, for example a TV signal decoder, is employed to convert analog image data (for example in an NTSC or a PAL format) into digital image data (for example in a YUV422 format), and the digital image data are then transmitted to the graphics chip 241 of the graphics card 24. The digital image data are compressed into compressed image data and stored in the frame buffer defined in the local memory 242. When the compressed image data are to be stored as an image file, the compressed image data can be written into the system memory 23 in a direct memory access (DMA) mode and then transferred to the hard disc 26.

When the image file is ready for display, the image file is firstly transmitted from the hard disc 26 to the system memory 23, and then the compressed image data are moved into the frame buffer of the local memory 242 in a DMA mode. The image file is then decompressed by the data decompressing device 2412 and recovered into the original digital image data, which are then transmitted to the image display device 244 to be displayed on a screen 27.

Figure 3:
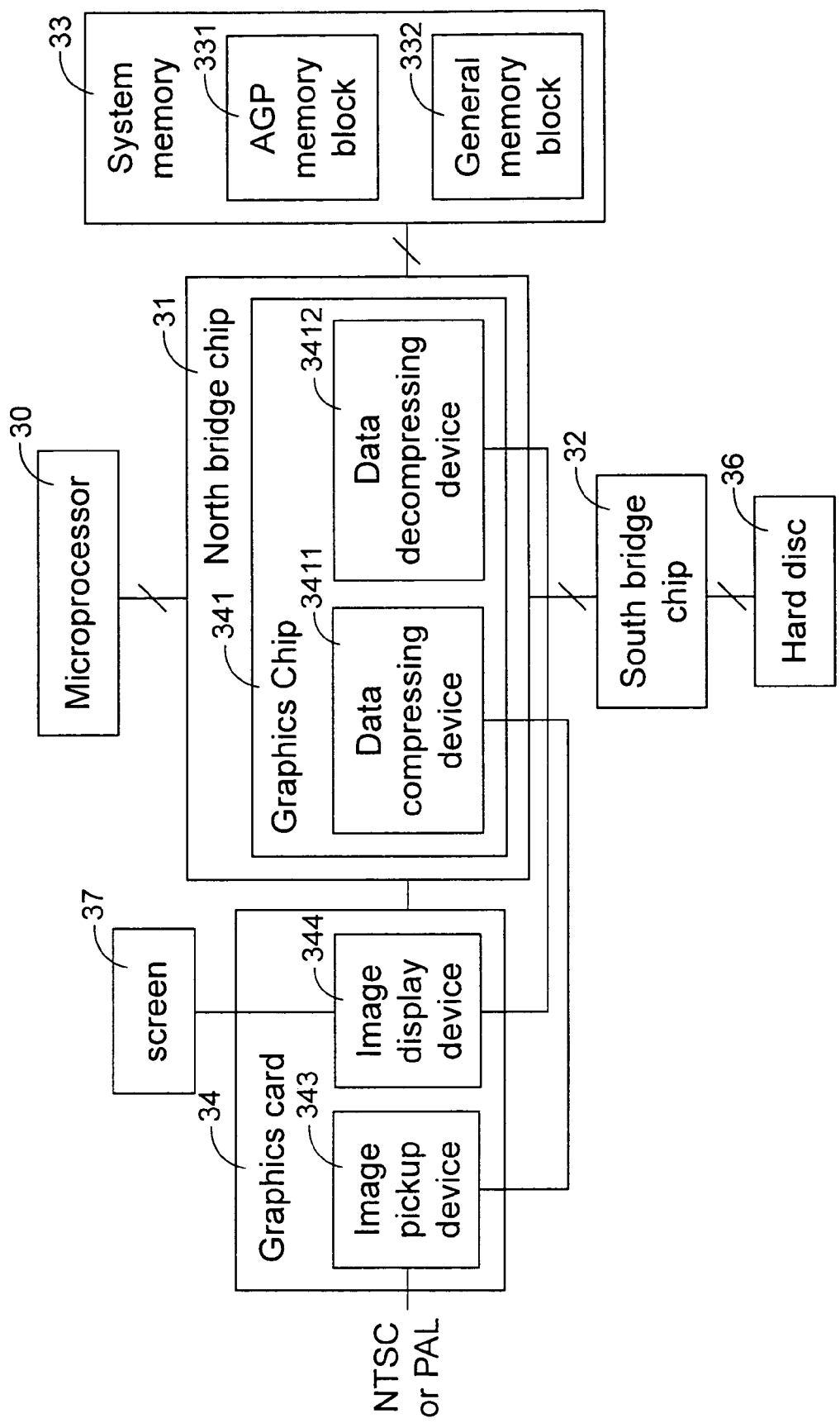
FIG. 3 is a block diagram showing a graphic display module for use in a computer system according to another preferred embodiment of the present invention.

Referring to FIG. 3, another graphics display module executing the graphics display module for use in a personal computer system according to the present invention is shown. The personal computer system comprises a microprocessor 30, a north bridge chip 31, a south bridge chip 32, a system memory 33 and a graphics card 34. The north bridge chip 31 and the south bridge chip 32 control data flows among the microprocessor 30, the system memory 33, and a plurality of I/O devices including the graphics card 34. The graphics card 34 is electrically connected to the north bridge chip 31 via a PCI (Peripheral Component Interconnect) or AGP (Accelerated Graphics Port) bus, and comprises an image pickup device 343 and an image display device 344. The image pickup device 343, for example a TV signal decoder, is employed to convert analog image data (for example in an NTSC or a PAL format) into digital image data (for example in a YUV422 format). The digital image data are then transmitted to a graphics chip 341 integrated into the north bridge chip 31. A data compressing device 3411 and a data decompressing device 3412 are incorporated in the graphics chip 341. The digital image data, transmitted from the image pickup device 343 are compressed into compressed image data by the data compressing device 3411 and stored in a frame buffer defined in an AGP (Accelerated Graphics Port) memory block 331 of the system memory 33. When the compressed image data are to be stored as an image file, the compressed image data are written into a general memory block 332 in the system memory 33 in a DMA mode and then transferred to the hard disc 36.

When the image file is ready for display, the image file is firstly transmitted from the hard disc 36 to the AGP memory block 331 of the system memory 33. The image file is then decompressed by the data decompressing device 3412 and recovered into the original digital image data, which are then transmitted to the image display device 344 to be displayed on a screen 37.

Since the image data are compressed in advance, the data to be transmitted will be effectively minimized during the image pickup and display operations. Therefore, memory space, memory bandwidth, bandwidth of the PCI or the AGP bus and even storage space of the non-volatile memory device can be largely saved so as to enhance the overall performance of the computer system.

The data compressing and decompressing devices and the graphics display methods applicable thereto will be further illustrated in detail as follows by giving the graphics display module of FIG. 2 as an example.

Figure 4:
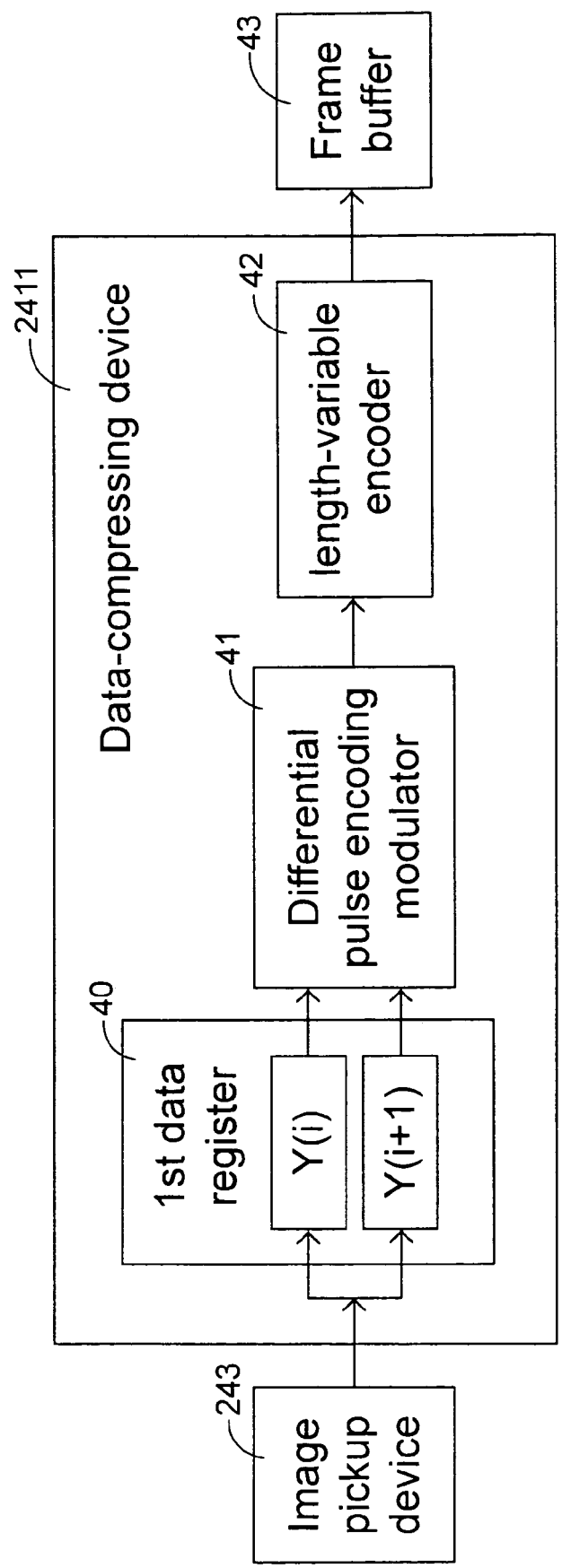
FIG. 4 is a block diagram showing the compressing device for use in the graphic display module according to a preferred embodiment of the present invention.

Please refer to FIG. 4. The data compressing device 2411 of FIG. 2, which is arranged and coupled between the image pickup device 243 and a frame buffer 43, comprises a first data register 40, a differential pulse encoding modulator 41 and a length-variable encoder 42. The digital image data in a YUV422 format are exemplified herein for illustrating the compressing and decompressing operations, wherein Y indicates luma value, and U and V indicate chroma value. For processing the luma value Y, the luma values $Y(i)$ and $Y(i+1)$ of two immediately adjacent pixels, each being expressed by 8-bit digital data, are entered to the first data register 40. Then, the 8-bit digital data $Y(i)$ and $Y(i+1)$ are processed by the differential pulse encoding modulator 41, which functions as a first encoder, to take their difference. The difference between the luma values $Y(i)$ and $Y(i+1)$ are inputted into and processed by the length-variable encoder 42, which functions as a second encoder, to obtain the compressed data.

Please refer to the correlation table of FIG. 5A or 5B, the left portion of which is associated with the encoding operation of length-variable encoder 42. In the table, the possible differences Di between the luma values $Y(i)$ and $Y(i+1)$, i.e. $Di=Y(i+1)-Y(i)$, are listed. The differences Di could be positive or negative. Since 8-bit digital data $Y(i)$ and $Y(i+1)$ are exemplified herein, they can be expressed by $Y(i)[7:0]$ and $Y(i+1)[7:0]$. Statistically, the color values of two immediately adjacent pixels, including luma and chroma values, will not differ dramatically. In other words, most differences Di are distributed within the small number zone. Accordingly, for the frequently appearing differences Di being relatively small numbers, they are encoded to impart thereto a reduced bit number less than eight so as to achieve the purpose of efficient compression. For the differences Di being relatively large numbers, which appear at quite limited frequency, the differences Di are expressed by 8-bit data. Further more, when the difference number is further increased, an exceptional encoding rule is used, which will be described later. In the table of FIG. 5A or 5B, the numbers 8 and 15 are used as threshold values for determining which encoding rule is applied for the current difference Di. It is understood, however, the threshold values may vary with practical designs.

Referring to the left two columns of FIG. 5A, for the differences Di having absolute values smaller than the first threshold value "8", they are encoded into various lengths of recovery data codes. For example, when Di=0, the recover data code is "100". When Di=1 or −1, the recover data code is "101s", wherein s is either 0 or 1 for representing the positive or negative sign of the difference Di. When the absolute value of Di is equal to or greater than the first threshold value "8" but no greater than the second threshold value "15", an 8-bit recovery data code is used to represent the difference Di. Likewise, a symbol "s" is tagged to indicate the difference is either positive or negative. When the absolute value of Di is greater than the second threshold value "15", the corresponding recovery data code is defined by a bit value equal to Di/2.

Figure 6:
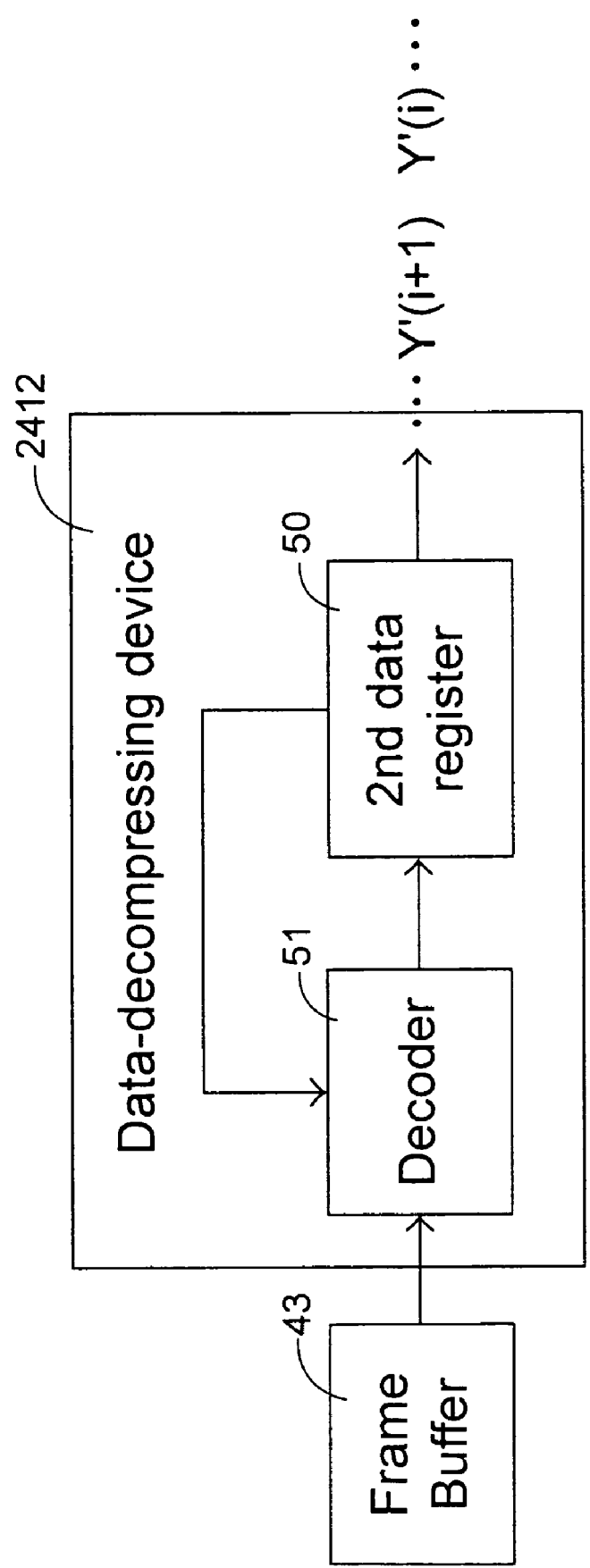
FIG. 6 is a block diagram showing the decompressing device for use in the graphic display module according to a preferred embodiment of the present invention.

Since Di is equal to $Y(i+1)-Y(i)$, $Y'(i+1)$ can be obtained by adding Di' to $Y'(i)$ in the decompressing process, where $Y'(i+1)$ indicates the decompressed luma value of the currently processed pixel, Di' indicates the decoded difference, and $Y'(i)$ indicates the decompressed luma value of the previous pixel, which has been stored in the second data register 50 (FIG. 6). The decoded difference Di' is obtained by decoding the recovery data code. For example, the recovery data code "100" will be decoded to obtain the decoded difference Di equal to 0. The decompressed luma value $Y'(i+1)$ of the currently processed pixel, which is substituted by $Y'(i)+Di'$, is thus equal to $Y'(i)+0=Y'(i)$. In another example, if the recovery data code is "10s", it will be decoded to obtain the decoded difference Di'=1 or −1 and thus $Y'(i+1)=Y'(i)\pm 1$. In the case that the absolute value of the difference Di' is greater than the second threshold value, e.g. 15, the decoded difference Di' is obtained by doubling the bit value of the recovery data code Di/2. The decoded difference Di' is then added to the decompressed luma value $Y'(i)$ of the previous pixel to obtain the current decompressed luma value $Y'(i+1)$.

Another embodiment of the compressing method is referred to the table of FIG. 5B. FIG. 5B's table is similar to FIG. 5A's except the encoding rule applied when the absolute value of Di is greater than the second threshold value, e.g. "15". In this case, the recovery data code for Di having an absolute value greater than 15 is not directly correlated to the difference Di any longer. In stead, the recovery data code is obtained by dividing the luma value $Y(i+1)$ by two. In other words, the end bit, i.e. the least significant bit, of the luma value Y(i+1) is truncated, and the bit "0" is added to the truncated luma value Y(i+1) as the leading bit.

It is to be noted that according to the encoding rules as shown in FIG. 5B, all the differences Di having absolute values equal to or smaller than the second threshold value "15" have the same leading bit "1", while the others have the same leading bit "0".

Afterwards, when the compressed data stored in the frame buffer 43 in the format of the recovery data codes are to be displayed, the data decompressing device 2412 comprising a second data register 50 and a decoder 51, as shown in FIG. 6, recovers the compressed data stored in the frame buffer into the digital image data Y'(i+1), Y'(i), . . . . First of all, the decoder 51 determines whether the absolute value of the difference Di' is larger or smaller than the second threshold value according to the leading bit of the recovery data code. For example, as shown in FIG. 5B, if the leading bit is "1", it is indicated that the absolute value of the difference Di' is no greater than the second threshold value. Since Di is equal to Y(i+1)−Y(i), the decompressed data Y'(i+1) can be obtained by adding Di' to Y'(i). Accordingly, the decompressed luma value Y'(i+1) is obtained by adding the difference value Di' to the luma valur Y'(i) of the previous pixel, which is stored in the second data register 50. As for the difference Di', it can be realized by decoding the recovery data code, as mentioned above. On the other hand, if the leading bit is "0", it is indicated that the absolute value of the difference Di' is greater than the second threshold value.

In this case, the bit value of the divided luma value Y(i+1) is directly doubled to obtain the decompressed luma value Y'(i+1). That is, the most significant 7 bits of the luma value Y(i+1) are recovered, and a bit "0" is tagged to obtain the decompressed luma value Y'(i+1).

In spite the recovered digital image data may be a little bit distorted when the absolute value of Di between two immediately adjacent pixels is greater than the second threshold value, in either of the embodiments as shown in FIGS. 5A and 5B. The slight distortion is negligible under such highly contrast situation.

The above embodiments are illustrated with luma values. The same principle can be applied to the chroma values U or V as well. No repeated description will be made herein.

Figures 7A, 7B:
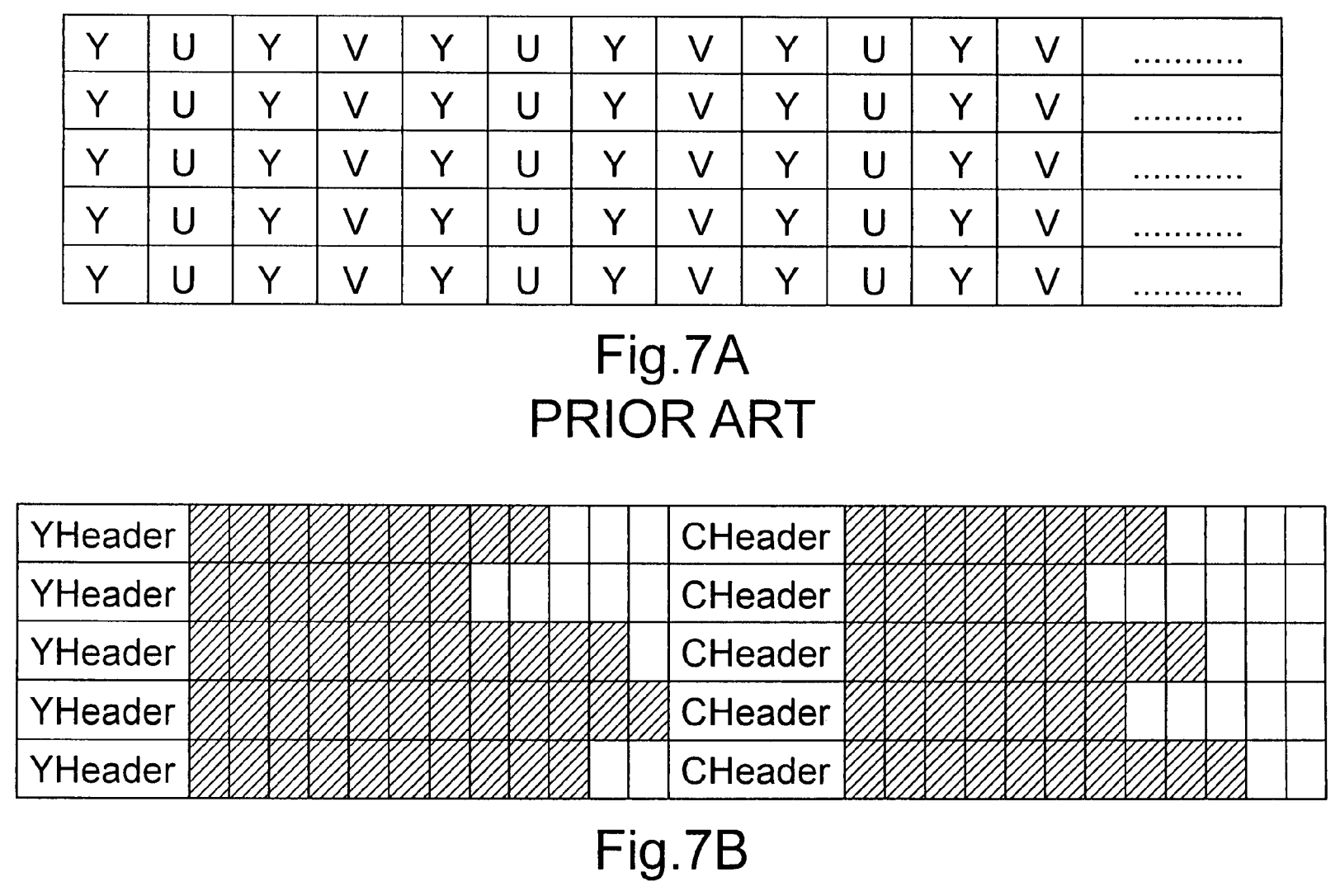

Conventionally, a format as shown in FIG. 7A is used to store the compressed image data. For the compressed data obtained by the present compressing method, however, such format is not suitable because the bit numbers of Y, U and V may vary. Therefore, an improved storing format of the compressed image data is adopted for solving this problem. Please refer to FIG. 7B, wherein YHeader and CHeader indicate the luma and the chroma data, respectively. The information of the YHeader and CHeader facilitates to the subsequent decompressing operation and/or DMA operation. For example, the YHeader and CHeader are encoded with 0000-0000 to 0000-0111. The luma data (Y) and the chroma data (U and V) are stored in different memory buffers. This format facilitates the practice of the pipeline architecture in the hardware circuit. Since the sampling frequency of luma data Y is twice of the chroma data U or V under the YUV 422 format, two decoders can be used to decoding the luma data and the chroma data, respectively, in the decompressing process. By this way, the complete pixel data Y, U and C can be recovered by decoding one entry of data at each clock unit by each decoder.

From the above description, it is apparent that the compressing and decompressing method can be easily performed and especially comply with the requirement of the graphics display device and graphics display method involving with data compression and decompression mentioned above. The present invention is also advantageous for no requirement on complicated circuitry.

While the invention has been described in terms of what is presently considered to be the most practical and preferred embodiments, it is to be understood that the invention needs not be limited to the disclosed embodiment. The compressing and decompressing method, although being illustrated with reference to graphics display device and method, can be applied to various image-processing fields in addition to graphics display. It is intended to cover various modifications and similar arrangements included within the spirit and scope of the appended claims which are to be accorded with the broadest interpretation so as to encompass all such modifications and similar structures.

What is claimed is:

1. A data-compressing method, comprising steps of:
operating a first and a second data of two immediately adjacent pixels to take a difference therebetween;
encoding said difference into a first recovery data code having a bit number less than m when the absolute value of said difference is less than a first threshold;
encoding said difference into a second recovery data code having a bit number equal to m when the absolute value of said difference is no less than said first threshold but no greater than a second threshold; and
encoding said second data into a third recovery data code by truncating an end bit from said second data and grafting a designated bit into said second data as a leading bit of said third recovery data code when the absolute value of said difference is greater than said second threshold.

2. The data-compressing method according to claim 1 wherein said first and said second data are luma values of two immediately adjacent pixels.

3. The data-compressing method according to claim 1 wherein said first and said second data are chroma values of two immediately adjacent pixels.

4. The data-compressing method according to claim 1 wherein said bit number of said first recovery data code varies with said difference.

5. The data-compressing method according to claim 1 wherein each of said first and said second recovery data codes corresponding to said difference having the absolute value greater than zero but no greater than said second threshold includes a tag bit representing the sign of said difference.

6. The data-compressing method according to claim 1 wherein each of said first and said second data and the absolute value of said difference has a bit number equal to m, and a bit number of said third recovery data code is equal to m.

7. The data-compressing method according to claim 1 wherein a leading bit of each of said first and said second recovery data codes is different from said leading bit of said third recovery data code.

8. The data-compressing method according to claim 7 wherein said leading bit of each of said first and said second recovery data codes is "1", and said leading bit of said third recovery data code is "0".

9. A data-decompressing method for use with said data-compressing method according to claim 7, comprising steps of:
receiving a recovery data code;
checking the leading bit of said recovery data code to determine whether the absolute value of said difference is greater than said second threshold;

realizing said difference according to said recovery data code and a correlation table, and adding said difference to said first data to recover said second data when the absolute value of said difference is no greater than said second threshold; and truncating the leading bit of said recovery data code and tagging an end bit to said recovery data code to recover said second data when the absolute value of said difference is greater than said second threshold.

10. A data compressing and decompressing device for use with an image pickup device and a frame buffer, comprises:
- a first data register in communication with the image pickup device for storing therein a first and a second data outputted by the image pickup device;
- a first encoder in communication with said first data register, operating said first and said second data to obtain a difference between values of said first and said second data; and
- a second encoder in communication with said first encoder and said frame buffer, encoding said difference into a length-variable recovery data code in a first condition of said difference, encoding said difference into a first constant-length recovery data code in a second condition of said difference, and encoding said second data into a second constant-length recovery data code by truncating an end bit from said second data and grafting a designated bit into said second data as a leading bit in a third condition of said difference.

11. The data compressing and decompressing device according to claim 10, further comprising:
- a second data register storing therein said first data having been compressed and decompressed; and
- a decoder in communication with said frame buffer and said second data register, decoding said length-variable and said first constant length into said difference according to a correlation table, and decoding said second constant length recovery data code by operating said second data.

* * * * *